June 18, 1935. F. A. BRAUCHT 2,004,923
MEANS FOR MOUNTING LENSES
Filed April 13, 1932
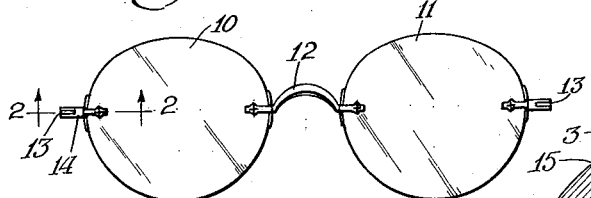
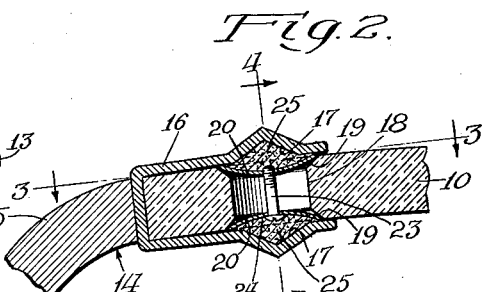
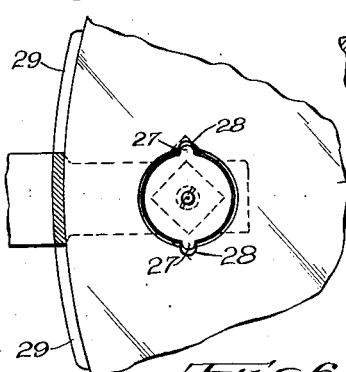
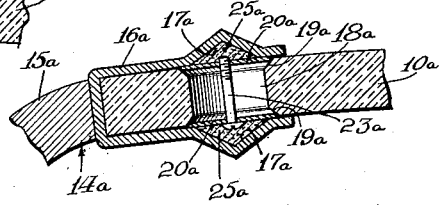
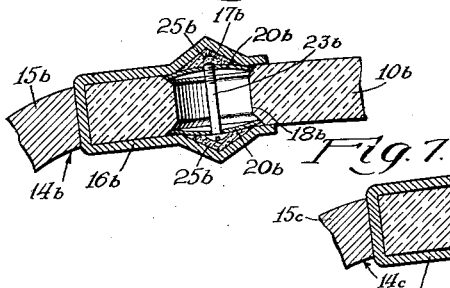
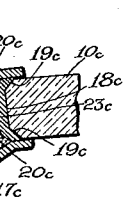
Inventors:
Frederick A. Braucht,
By Dyrenforth, Lee, Chritton & Wiles
Attorneys Patented June 18, 1935

2,004,923

UNITED STATES PATENT OFFICE 2,004,923

MEANS FOR MOUNTING LENSES

Frederick A. Braucht, Chicago, Ill., assignor to Belgard-Spero, Inc., a corporation of Delaware Application April 13, 1932, Serial No. 605,063

4 Claims. (Cl. 88—47)

The invention relates to a means for mounting lenses and is particularly adapted to be embodied in eyeglasses, spectacles, or the like.

A particular object of the invention is to provide improved means for securing the lenses of eyeglasses, etc., to the bows and bridge members.

Eyeglasses which embody the invention have a metallic member secured in or to the lens. In the preferred construction, the metallic members are tubular rivets which fit snugly in holes drilled in the lenses. In other forms of the invention, small metallic discs, etc., are mounted in apertures provided in the lenses. The bridge members and the bows of the eyeglasses are secured to the metallic members by solder, or the equivalent, the construction being such that the bridge members and the bows may be assembled with the lenses before the heat is applied to fuse the solder.

Other objects and advantages will become apparent as the following detailed description progresses, reference being had to the accompanying drawing wherein Fig. 1 is a front elevation of a pair of eyeglasses which embody the invention.

Fig. 2 is an enlarged section taken on line 2—2 of Fig. 1.

Fig. 3 is a section taken on line 3—3 of Fig. 2.

Fig. 4 is a section taken on line 4—4 of Fig. 2.

Fig. 5 is a fragmentary section taken through eyeglasses which embody another form of the invention.

Fig. 6 is a fragmentary section taken through eyeglasses which embody another form of the invention.

Fig. 7 is a fragmentary section taken through eyeglasses which embody another form of the invention.

Referring for the present to Figures 1 to 4, inclusive, wherein a preferred embodiment of the invention is illustrated, the reference characters 10 and 11 designate the lenses of a pair of eyeglasses provided with a bridge member 12, the bows 13 and the brackets 14, the bows 13 being pivoted to the brackets 14. The brackets 14 and the bridge member 12 are secured to the lenses 10 and 11, the bracket members and the bridge member being provided with parts of identical construction to straddle the lenses so that they may be soldered to metallic members secured in the lenses. Therefore it will only be necessary to describe, in detail, the construction of the left-hand (Fig. 1) bracket member 14 and the manner in which it is secured to the lens 10. This is illustrated in Figures 2, 3 and 4.

The bracket member 14 may also be called a "lens mounting member". It comprises a body portion 15. Secured to the body portion 15 or formed integral therewith is a bifurcated or U-shaped member 16 provided with depressions 17 which register with a hole 18 drilled through the lens 10. The hole 18 is beveled at its ends. The bevels are designated by the reference character 19. Resting on the beveled surfaces 19 are dished metallic members 20, the convex surfaces of the members 20 being positioned to face each other. A screw 23 passes through an aperture 24 provided in one member 20 and is screw-threaded into the other. Obviously, the screw 23 secures the members 20 in the positions wherein they are illustrated in the lens. It will be noted, however, that the edges or peripheral portions of the dished members 20 extend a slight distance above the front and back surfaces of the lens so that a metal to metal contact is made with the U-shaped member 16.

The depressions 17 formed in the U-shaped member 16 are filled with solder 25 which solder is fused after the U-shaped member 16 has been assembled with the lens 10. The solder rigidly secures the U-shaped member 16 to the metallic members 20.

As best shown in Figures 3 and 4, the dished members 20 are each provided with diametrically disposed lugs 27 which engage notches 28 cut in the beveled surfaces 19. The lugs 27 prevent rotation of the dished members 20 around the longitudinal axis of the screw 23.

As illustrated in Figures 1 and 3, the U-shaped member 16 is provided with laterally extending lugs 29 which engage the edge of the lens 10.

In Figure 5 another form of the invention is illustrated.

A lens 10a is provided with a drilled hole 18a which is beveled at its ends to provide frustro conical surfaces 19a. Secured to the lens is a bracket member 14a comprising a body portion 15a to which a U-shaped member 16a is soldered. It will be noted that the lens 10a, the bracket member 14a and the U-shaped member 16a are identical in construction with the lens 10, the bracket member 14 and the U-shaped member 16, respectively, shown in Figures 1 to 4, inclusive. Seated in the beveled ends of the hole 18a are flat discs 20a which are secured to each other by a screw 23a. The outer surfaces of the discs 20a project a slight distance beyond the front and back surfaces of the lens 10a. The U-shaped member 16a is secured to the discs 20a by solder 25a disposed in pockets or depressions 17a formed in the U-shaped member 16a.

Figure 6 illustrates another form of the invention in which the dished members 20 and the discs 20a are replaced with outwardly dished members 20b. The dished members 20b are secured by a screw 23b in a hole 18b drilled in a lens 10b. A U-shaped member 16b which is identical in construction with the U-shaped members 16 and 16a is secured to the outwardly dished members 20b by solder 25b disposed in depressions or pockets formed in the U-shaped member 16b.

Another form of the invention is illustrated in Figure 7. A lens 10c is provided with a drilled hole 18c which is beveled at its ends as shown at 19c. Fitting snugly in the hole 18c is a tubular rivet 30c which is preferably formed from brass or copper. It will be noted that the ends of the tubular rivet 30c are riveted over to engage the beveled surfaces 19c so that the rivet is held against longitudinal displacement in the lens. Dished metallic members 20c disposed at the ends of the tubular rivet 30c are secured to each other by a screw 23c, the screw 23c being adapted to clamp the dished members 20c to the tubular rivet. Secured to the lens 10c is a bracket member 14c which comprises a body portion 15c and a U-shaped member 16c. The U-shaped member 16c is provided with pockets 17c alined with the ends of the hole 18c. Solder 25c disposed in the pockets 17c secures the U-shaped member 16c to the tubular rivet and the dished members 20c.

It is to be understood that the term "soldered" is employed in a broad sense in the appended claims. The tubular rivets, dished members, pins and apertured metallic members secured in the holes in the lenses may be tinned before they are assembled with the lenses. When these parts are tinned in this manner, it is not necessary to fill the tubular rivets, etc., with solder, or the equivalent.

It will be noted that in each construction described above, the metallic parts secured directly to the lens make direct contact with the mounting members and are soldered thereto. Thus, the dished members 20 make direct contact with the U-shaped members 16 in the construction shown in Figures 1 to 4, inclusive. This construction insures that the mounting member will be soldered firmly to the metallic part, clamped or otherwise secured to the lens.

While we have shown and described certain embodiments of our invention, it is to be understood that it is capable of many modifications. Changes, therefore, in the construction and arrangement may be made without departing from the spirit and scope of the invention as disclosed in the appended claims, in which it is our intention to claim all novelty inherent in our invention as broadly as possible, in view of the prior art.

I claim:

1. In a pair of eyeglasses having a lens with a hole formed therethrough, a pair of metal discs engaging opposite sides of said lens and extending over said hole, means connecting said discs, and a mounting member having arms straddling said lens and equipped with pockets aligned with said metal discs, and solder within said pockets connecting said arms and said discs.

2. In a pair of eyeglasses equipped with a lens having a hole formed therethrough, a metallic member engaging one face of said lens and extending over said hole, means extending through said hole for securing said metallic member in place, and a mounting member having bifurcated arms extending over said hole, at least one of said arms being equipped with a pocket adjacent said metallic member, and solder in said pocket connecting the pocket-equipped arm to said metallic member.

3. In a pair of eyeglasses equipped with a lens having a hole formed therethrough, a pair of discs engaging said lens on opposite sides thereof and extending over the ends of said hole, a pin connecting said discs, a mounting member provided with furcated arms straddling said lens, said arms having pockets therein aligned with said discs, and solder in said pockets connecting said arms to said discs.

4. In a pair of eyeglasses equipped with a lens having a hole formed therethrough, a metallic member secured over said hole of the lens, a mounted member having furcated arms straddling said lens, said arms being equipped with pockets aligned with said hole, and solder in said pockets securing said arms to said metallic member.

FREDERICK A. BRAUCHT.